United States Patent
Anand et al.

(10) Patent No.: US 10,341,748 B2
(45) Date of Patent: Jul. 2, 2019

(54) PACKET-OPTICAL IN-BAND TELEMETRY (POINT) FRAMEWORK

(71) Applicant: Infinera Corporation, Sunnyvale, CA (US)

(72) Inventors: Madhukar Anand, Fremont, CA (US); Ramesh Subrahmaniam, Fremont, CA (US); Sanjoy Bardhan, San Jose, CA (US); Radhakrishna Valiveti, Union City, CA (US)

(73) Assignee: Infinera Corporation, Sunnyvale, CA (US)

( * ) Notice: Subject to any disclaimer, the term of this patent is extended or adjusted under 35 U.S.C. 154(b) by 48 days.

(21) Appl. No.: 15/801,526

(22) Filed: Nov. 2, 2017

(65) Prior Publication Data

US 2019/0014394 A1 Jan. 10, 2019

Related U.S. Application Data

(60) Provisional application No. 62/528,964, filed on Jul. 5, 2017.

(51) Int. Cl.
*H04Q 11/00* (2006.01)
*H04L 12/721* (2013.01)
(Continued)

(52) U.S. Cl.
CPC ..... *H04Q 11/0067* (2013.01); *G06F 16/2322* (2019.01); *G06F 16/2477* (2019.01); *G06F 16/9014* (2019.01); *H04J 3/0673* (2013.01); *H04J 14/0267* (2013.01); *H04L 9/3242* (2013.01); *H04L 9/3297* (2013.01); *H04L 45/38* (2013.01); *H04L 69/22* (2013.01); *H04M 11/002* (2013.01); *H04Q 9/02* (2013.01); *H04Q 11/0066* (2013.01); *H04L 12/4633* (2013.01);
(Continued)

(58) Field of Classification Search
CPC ........... H04Q 11/0067; H04Q 11/0066; H04L 69/22; H04M 11/002; H04J 14/0267
See application file for complete search history.

(56) References Cited

U.S. PATENT DOCUMENTS

2015/0200838 A1* 7/2015 Nadeau ................. H04L 45/124
398/58

OTHER PUBLICATIONS

RAD Data Communications Ltd. "Ethernet OAM Standards Reference Guide". 7 pages. Dec. 2007.
(Continued)

*Primary Examiner* — Hashim S Bhatti
(74) *Attorney, Agent, or Firm* — David L. Soltz

(57) ABSTRACT

A method and system for packet-optical in-band telemetry (POINT) that may be used in a packet-optical network is disclosed herein. An intermediate POINT device may receive a packet including at least a header and a payload at a packet layer. The POINT device may read intent information from the header, and the intent information may indicate a type of telemetry data to be collected. The POINT device may translate the intent information from the packet layer to generate a device-specific action in an optical layer to the type of telemetry data indicated by the intent. The POINT device may execute the device-specific action in the optical layer to generate a response corresponding to the intent, associate the response with the intent, and encode the response in the packet layer for downstream data forwarding.

20 Claims, 9 Drawing Sheets

(51) Int. Cl.
| | |
|---|---|
| *H04J 14/02* | (2006.01) |
| *H04L 29/06* | (2006.01) |
| *H04M 11/00* | (2006.01) |
| *H04Q 9/02* | (2006.01) |
| *G06F 16/2458* | (2019.01) |
| *G06F 16/23* | (2019.01) |
| *H04J 3/06* | (2006.01) |
| *H04L 9/32* | (2006.01) |
| *G06F 16/901* | (2019.01) |
| *H04L 12/709* | (2013.01) |
| *H04L 12/46* | (2006.01) |

(52) U.S. Cl.
CPC ........ *H04L 12/4641* (2013.01); *H04L 45/245* (2013.01); *H04Q 11/0005* (2013.01); *H04Q 2011/0083* (2013.01)

(56) References Cited

OTHER PUBLICATIONS

Bosshart et al., "P4: Programing Protocol Independent Processors", AACM SIGCOMM Computer Communication Review. vol. 44, No. 3. pp. 88-95. Jul. 2014.
Kim et al., "In-band Network Telemetry (INT)" Jun. 2016.
"Traffic Monitoring Using sFlow," http://www.sflow.org/sFlowOverview.pdf, Available at: https://web.archive.org/web/20170926195635/http://www.sflow.org/sFlowOverview.pdf (Aug. 5, 2003).
Marc Lavine, "sFlow Version 5", http://www.sflow.org/sflow_version_5.txt. Jul. 2004.
"OpenConfig FAQ for Operators" http://www.openconfig.net/docs/faq-for-operators/, Jun. 2015.
"OpenConfig FAQ" http://www.openconfig.net/docs/faq/, Oct. 2014.
Edelman, "OpenConfig, Data Models, and APIs", http://jedelman.com/home/openconfig-data-models-and-apis/, Avaiable at: https://web.archive.org/web/20151229023001/http://jedelman.com/home/openconfig-data-models-and-apis/ (Dec. 29, 2015).
Jeyakumar et al. "Millions of Little Minions: Using Packets for Low Latency Network Programming and Visibility" SIGCOMM'14, Aug. 17-22, 2014, Chicago, IL, USA.
F. Brockners, S. Bhandari, S. Dara, C. Pignataro, J. Leddy, S. Youell, "Proof-of-Transit" https://datatracker.ietf.org/doc/draft-brockners-proof-of-transit. Oct. 30, 2017.
Nikhil Handigol, Brandon Heller, Vimalkumar Jeyakumar, David Mazi'eres, Nick McKeown, "I Know What Your Packet Did Last Hop: Using Packet Histories to Troubleshoot Networks", 11th USENIX Symposium on NDSI, Apr. 2-4, 2014.
Alizadeh et al., "CONGA: Distributed Congestion Aware Load Balancing for Data Centers", Proceedings of the ACM Conference on SIGCOMM, Aug. 17-22, 2014, Chicago, IL, USA.
Gupta et al., "Network Monitoring as a Streaming Analytics Problem". In Proceedings of the 15th ACM Workshop on Hot Topics in Networks, HotNets-XV, Nov. 9-10, 2016, Atlanta, GA, USA pp. 106-112.
Madhukar Anand, Ramesh Subrahmaniam, Radhakrishna Valiveti. "Unifying Real-Time Telemetry for Fun and Profit in Packet-Optical Networks". In Proceedings of Photonics Networks and Devices, Advanced Photonics Conference, Jul. 24-27, 2017, New Orleans, USA.
Shamir, "How to Share a Secret" Communications of the ACM, Nov. 1979. vol. 22, No. 11. pp. 612-613.
Pignataro et al., "Layer Independent OAM Management in the Multi-Layer Environment (LIME)" https://datatracker.ietf.org/wg/lime/charter/. Availabkle at: https://web.archive.org/web/20150409203507/https://datatracker.ietf.org/wg/lime/charter/ (Apr. 9, 2015).
Trammell et al., "mPlane: an Intelligent Measurement Plane for the Internet," IEEE Communications Magazine, vol. 52, No. 5, pp. 148-156, May 2014.
Brockners, et al., "Proof of Transit" https://www.ietf.org/archive/id/draft-brockners-proof-of-transit-03.txt. Mar. 13, 2017.
Mizrahi et al., "The Case for Data Plane Timestamping", https://sites.google.com/site/talmizrahihome/files/DPT-SWFAN-Presentation.pdf. IEEE INFOCOM Workshop on Software-Driven Flexible and Agile Networking (SWFAN), Israel Institute of Technology, Apr. 2016.
Mizrahi et al., "The Case for Data Plane Timestamping in SDN" https://arxiv.org/pdf/1602.03342.pdf, IEEE INFOCOM Workshop on Software-Driven Flexible and Agile Networking (SWFAN),Technical Report, Feb. 2016.
Eppstein et al., "What's the Difference? Efficient Set Reconciliation without Prior Context" SIGCOMM'11, Aug. 15-19, 2011, Toronto, Ontario, Canada. pp. 218-229.
Lang, "Clock Recovery and Channelized SDH/SONET", http://www.chronos.co.uk/files/pdfs/itsf/2008/Day3/Clock_Recovery_and_Channelized_SONET-SDH_%28Tao_Lang,_Wintegra%29.pdf. Time & Synchronisation in Telecoms Conference 2008.
Mizrahi et al., "Network Service Header (NSH) Context Header Allocation: Timestamp" https://datatracker.ietf.org/doc/draft-mymb-sfc-nsh-allocation-timestamp. Aug. 20, 2017.
Li et al., "On Data Aggregation with Secure Bloom Filter in Wireless Sensor Networks", http://cacr.uwaterloo.ca/techreports/2010/cacr2010-22.pdf. University of Waterloo, Waterloo, Ontario, Canada. Available at: https://web.archive.org/web/20170829012307/http://cacr.uwaterloo.ca/techreports/2010/cacr2010-22.pdf (Aug. 29, 2017).
Brockners et al., "Next-gen Network Telemetry is Within Your Packets: In-band OAM" https://www.slideshare.net/frankbrockners/nextgen-network-telemetry-is-within-your-packets-inband-oam. Cisco, 2016.
Kumar et al., "Energy Efficient Secure Data Aggregation in Wireless Sensor Networks" http://isc.mst.edu/media/research/isc/documents/research/symposium/2011/Energy_Efficient_Secure_Data_Aggregation_in_WSNs.pdf. Proceedings of the 5th Annual ISC Research Symposium ISCRS 2011, Apr. 7, 2011, Rolla, Missouri.
Brockners et al., "Data Fields for In-situ OAM" https://datatracker.ietf.org/doc/draft-ietf-ippm-ioam-data/?include_text=1. Oct. 30, 2017.

\* cited by examiner

PACKET-OPTICAL IN-BAND TELEMETRY (POINT) FRAMEWORK

CROSS REFERENCE TO RELATED APPLICATIONS

This application claims the benefit of U.S. provisional application No. 62/528,964, filed Jul. 5, 2017, which is incorporated by reference as if fully set forth.

FIELD OF INVENTION

The disclosure relates generally to an in-band packet-optical telemetry framework system and method.

BACKGROUND

Network telemetry involves the use of automated tools and processes designed to collect measurements and other data at points throughout the network, which can then be used for network monitoring and performance analysis.

Modern packet networks are designed with a scaled out and centrally managed architecture to support elastic loads, large traffic volumes and high availability of services. For modern packet networks, traditional telemetry mechanisms, such as polling or streaming mechanisms, are proving to be inadequate at least in part due to limitations in notifying rapidly changing network state, a lack of extensibility for future network/system growth, and a lack of customization of data collection.

For example, streaming telemetry mechanisms, such as OpenConfig, try to streamline the notification of network state by having the network elements stream the telemetry data up to a central management entity where the data gets stored and processed. While streaming telemetry mechanisms employ extensive offline algorithms to process telemetry data, they are not designed to inherently improve the quality of the data collected.

To improve extensibility and bring flexibility into telemetry data collection, the In-band Network Telemetry (INT) framework was developed for packet networks. INT is implemented in the data plane such that telemetry information is carried in data packets (e.g., in the header of data packets) and can get modified with each hop. The data plane refers to the part of a device's architecture that makes forwarding decisions for incoming packets. For example, routing may be determined by the device using a locally stored table in which the device looks up the destination address of the incoming packet and retrieves the information needed for forwarding.

The INT framework relies on programmable data planes to bring flexibility to telemetry data collection. Devices with programmable data planes include network processors or general-purpose central processing units (CPUs) at the low end, and data path programmable switch chips at the high end. With INT, a source switch (or more generally, a source network device) incorporates an instruction header to collect network state information as a part of the data packet. Intermediate INT-capable switches (devices) interpret the instruction header and collect and insert the desired network state information in the data packet, which eventually reaches a sink switch and can be used as needed to monitor and evaluate the operation of the network. Advantages of INT include real-time telemetry rates, low CPU and operating system (O/S) overhead, and the flexibility to programmatically instrument packets to carry useful telemetry data. The programmable data planes used in INT have been explicitly designed for packet networks; however extending INT mechanisms into optical networks, where there is no notion of data packets, is far from straightforward due to factors such as layering and the presence of purely analog devices.

The emergence of integrated packet and optical networks, or "packet-optical networks", such as those interconnecting data centers, see additional challenges when it comes to network telemetry because of the different types of telemetry data collected in packet versus optical networks. For example, the telemetry data collected in a packet layer of a packet network, such as packet loss and latency, on a per-flow basis cannot be easily attributed to or correlated with data collected in the optical layer of an optical networks, such as bit error rates (BERs) and quality factor (Q-factor). Even in the scenario that the telemetry data collected in the packet layer does not indicate any errors in the optical layer, it is not possible to monitor any layer in the optical network for a specific duration of time using existing telemetry solutions because the optical network lacks the digital constructs used by existing telemetry solutions, and the packet layer does not have access to measurements in the optical network. Optical parameters may affect traffic flows. For example, if a link experiences degradation in Q-without link failure, operators can use the knowledge of that information to proactively move critical applications away from that particular link. Thus, it would be useful for network operators to be able to monitor optical parameters over time to use in routing and other applications.

Another challenge is that there is no standard mechanism to transfer telemetry data between layers other than at failure instances. A further challenge occurs in associating packet flow telemetry data with the corresponding data from optical transport network (OTN) layers, which involves piecing together telemetry data from many devices. Thus, existing telemetry solutions, including INT, do not address these challenges in packet-optical networks and are thus unable to achieve end-to-end correlation of collected network state data in packet-optical networks.

SUMMARY

An in-band packet-optical telemetry framework system and method are disclosed for real-time network monitoring. A method and system for packet-optical in-band telemetry (POINT) that may be used in a packet-optical network is disclosed herein. An intermediate POINT device may receive a packet including at least a header and a payload at a packet layer. The POINT device may read intent information from the header, and the intent information may indicate a type of telemetry data to be collected. The POINT device may translate the intent information from the packet layer to generate a device-specific action in an optical layer to the type of telemetry data indicated by the intent. The POINT device may execute the device-specific action in the optical layer to generate a response corresponding to the intent, associate the response with the intent, and encode the response in the packet layer for downstream data forwarding.

DETAILED DESCRIPTION OF THE EMBODIMENTS

Figure 1:
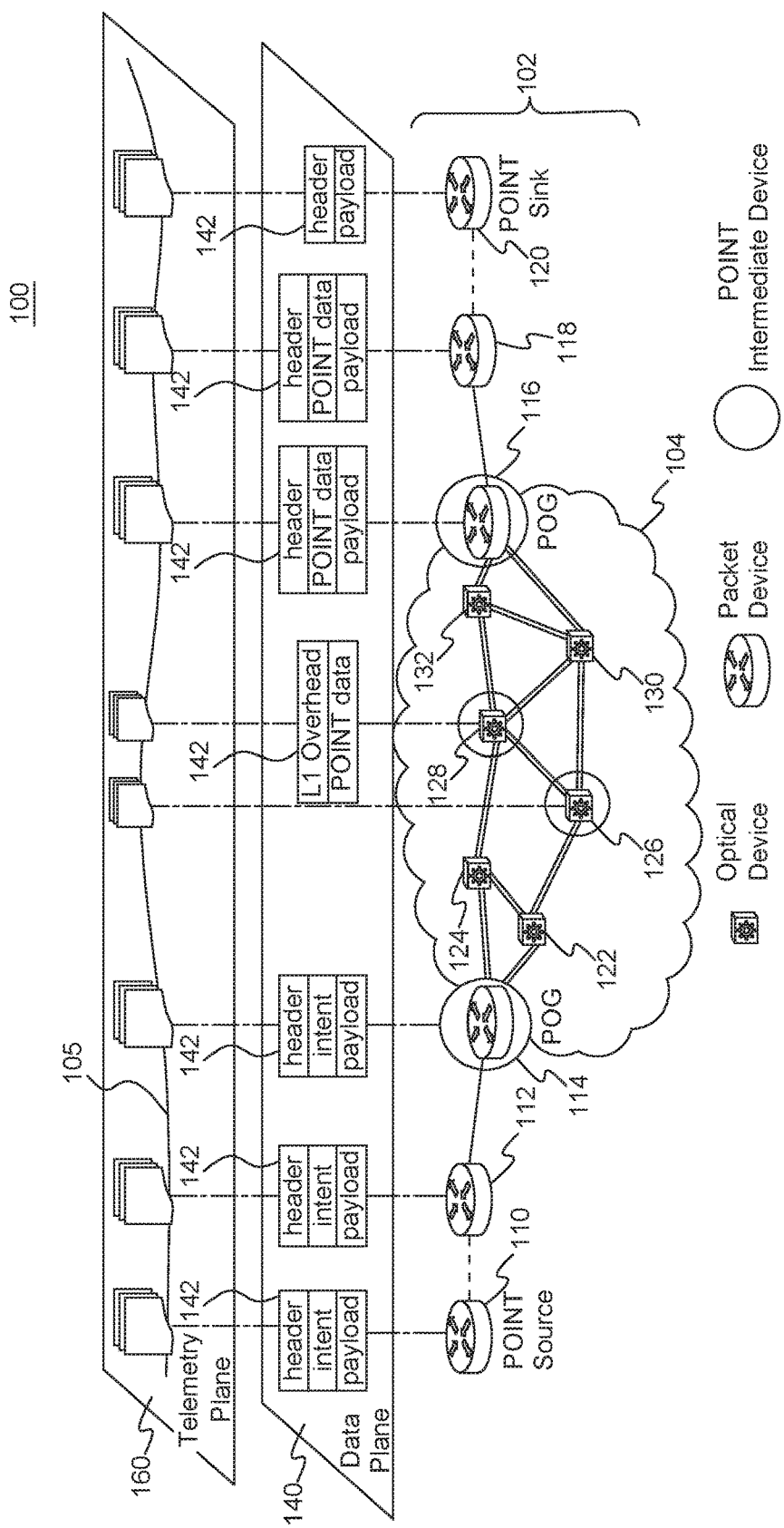
FIG. 1 is a high-level diagram of an example POINT framework implemented in an example packet-optical network, in accordance with the disclosures herein.

The disclosed packet-optical in-band telemetry (POINT) framework overcomes telemetry challenges for packet-optical networks by using constructs to unify telemetry across packet and optical network segments. The disclosed POINT framework provides a hierarchical intent-based telemetry framework to enable programmable collection of telemetry data in optical networks and integrated packet-optical networks. POINT realizes telemetry data collection by translating a telemetry request, implemented as an intent, into an appropriate device-dependent action. Thus, the intent and the associated response at POINT capable devices are translated into actions that use existing measurement mechanisms supported by non-POINT-capable devices (e.g., amplifiers or reconfigurable optical add-drop multiplexers (ROADMs) in optical networks). For example, an upstream POINT device interprets the intent and translates into a measurement mechanism that downstream non-POINT devices support. The POINT-capable device coordinates with non-POINT devices to collect the associated information and embeds it back into the data stream as responses. Thus, data passing and mapping of telemetry data across layers is achieved by requiring each network device to map the intent and the associated response across layers. Additionally, the POINT framework accommodates for delayed and aggregated responses to a telemetry data collection request in order to handle size limitations in individual time-division multiplex (TDM) frames (e.g., optical data unit (ODU) frames) for collecting telemetry data.

The existing INT framework, designed for packet networks, is not capable of handling packet-optical networks because not all devices in the optical network are capable of recognizing and instrumenting INT headers located in packets. Many challenges exist that make it difficult to extend INT to packet-optical networks. For example, limited hardware capability in many optical network devices, such as amplifiers and ROADMs, implies such devices cannot participate in existing INT. Data passing across layers is also a challenge because packets are encapsulated inside the optical network using constructs, such as a hierarchy of optical data unit (ODU) frames, which are circuit switched at one or more intermediate optical transport network (OTN) nodes. The intermediate nodes that operate at the ODU layer can only process ODU overheads, and cannot transfer any data to the packet layer in the packet network. Furthermore, the packet modifications may be possible at some, but not all, ODU termination points.

Another challenge exists in the size limitations in passing telemetry data. Layer 1 signals in optical networks, such as ODUs, have a fixed size of overhead in each frame that is usable for in-band telemetry. Consequently, it may not be possible for intermediate devices to append telemetry data along the path in a way that increases the size of the frame overhead arbitrarily. In fact, it may not be possible for intermediate nodes to inject a large and variable length response field using the fixed overhead available in the frame. Additionally, complications arise in mapping of telemetry data across layers because end-to-end packet-optical telemetry would need to map telemetry data collected in the optical network, such as BER and fraction of idle-frames, into appropriate packet-level telemetry data for consumption in the packet network.

The disclosed POINT framework is designed to address these challenges by providing mechanisms to carry telemetry data in optical networks, and merge the collected optical telemetry data into appropriate packet flows. Furthermore, while the existing INT framework uses instructions to indicate the precise telemetry data that needs to be collected by devices, the disclosed POINT framework captures the intent of telemetry data collection and addresses the translation of intent by providing instructions to specific devices. For example, the instructions for intent translation may be provided to specific devices during deployment and/or operation. This level of indirection allows POINT devices to use different layer-specific instruction and encoding to collect the desired telemetry data.

Compared to previous approaches, POINT is focused on targeted telemetry collection, correlation of optical and packet telemetry data, and mechanisms to fine tune the data collection process to solve network-wide problems and support new use-cases. Moreover, POINT can coexist with existing telemetry mechanisms, such as OpenConfig and Mplane.

The disclosed POINT framework provides a general abstraction that creates a unified telemetry data plane across packet and optical networks instead of targeted solutions that focus only on individual architectural points in the network, such as access, metro, and core networks. Further, the disclosed POINT framework enables programmable collection of telemetry data from the optical network and facilitates correlation of packet and optical network telemetry data. Programmable collection of data includes the ability to specify the trigger for telemetry data collection, targeting the data collected to a specific flow or a set of flows, and selectively propagating the telemetry data between the packet and optical networks. As such, the disclosed POINT captures new use-cases of packet-optical network telemetry, as further described herein.

The disclosed POINT framework is described in detail herein. Example applications of POINT are given for use in packet-optical network. However, it is understood by one skilled in the art that the mechanisms disclosed herein can be similarly used in any type of network, including packet networks, optical networks, circuit-switched networks or any other type of wired and/or wireless network.

Some elements that may be employed in the POINT framework include, but are not limited to, the following elements: POINT intent header fields; POINT response fields; a source device; a sink device; and/or POINT intermediate devices, which may include one or more Packet Optical Gateways (POGs). A POINT intent (or simply intent) is a set of fields in a packet or frame header that communicates an intent to a POINT-capable device to collect state information (e.g., network or device specific) and an optional trigger for such a state collection. A POINT response (or simply response) is a set of fields in the packet or frame header that communicates the result of processed POINT intent at a corresponding POINT-capable device.

A source device may be a packet device (e.g., located in a packet segment of a packet-optical network) that has the capability to insert intent for collecting telemetry data into a packet that will travel along a specified packet-optical path. A sink device may be a packet device that gathers or consumes the collected telemetry data along the packet-optical path and acts on that data appropriately. A POINT intermediate device may be an optical device that has the digital capability to interpret the intent, translate it across layers, and aggregate and propagate the telemetry state information in the network. A Packet Optical Gateway (POG) is an example of a POINT intermediate device that interfaces with both the packet and optical networks.

The disclosed POINT framework assumes that there are some packet devices in the network with programmable data planes that support insertion and manipulation of telemetry data in the packet header. For example, packet-optical devices (e.g., POGs) at the edges of the optical network may support such a capability. Inside of the optical segment of the packet-optical network, POINT can work with purely analog devices. In an example, some of the optical devices may have digital capability to interpret the intent and generate a response while most of the optical devices may be analog or passive from a POINT viewpoint.

According to the disclosed POINT framework, POINT intent is communicated to the (POINT) intermediate devices and indicates the type of telemetry data desired by the POINT source device. The POINT intent may include a trigger for telemetry data collection. The precise semantics of intent and response may be dependent on many factors such as the specific deployment architecture, network topology, and capabilities of individual POINT devices. In an example implementation of the POINT framework, precise semantics of intent and/or response may be communicated to the POINT intermediate devices appropriately (e.g., via software or firmware downloads) before they are used.

Different types of intent may be supported in the disclosed POINT framework, including, but not limited to, sink-based intent and group-based intent. A sink-based intent type serves to communicate packet flow metadata information from the source device to the sink device. Sink-based intents may also be used by the source device to successively issue multiple intents over time to dynamically refine the collected telemetry data to better suit the use-case. A group-based intent type indicates that intent be executed only on network devices that are part of a specific group. For example, group-based intent may be used to instruct devices to collect specific telemetry data at path or tunnel termination points (e.g., at all edge devices), such as at optical edge points or at data management centers only. A deployment specific mechanism for communicating the group membership may be via explicit communication to the devices in the group or may be implicitly inferred through network device state information, for example. In an example, multiple concurrent intents of same and/or different type may be communicated along with a packet.

FIG. 1 is a high-level diagram of an example POINT framework 100 implemented in an example packet-optical network 102, in accordance with the disclosures herein. The example packet-optical network 102 includes packet devices 110, 112, 114, 116, 118 and 120, and an optical network 104 segment that includes optical devices 122, 124, 126, 128, 130 and 132. The POINT framework 100 can operate over an optical network 104 with Layer-0 (L0) and/or Layer-1 (L1) circuits. The packet devices include a POINT source device 110 and a POINT sink device 120, as well as POGs 114 and 116 located at the interfaces between the packet segments and optical network 104 segment of the packet-optical network 102. The packet devices 110, 120, 114 and 116 can operate at the packet layer, for example at layer 2 (L2)/layer 3 (L3) (e.g., L2 may be a data link layer and L3 may be a network layer, which exist above a physical layer). POGs 114 and 116 are also connected via lower layer devices, such as L1/L0 devices 122, 124, 126, 128, 130 and 132. In the example packet-optical network 102, POGs 114 and 116 and optical devices 126 and 128 are configured as POINT intermediate devices (i.e., devices with digital capability to interpret POINT intent, translate it across layers, and aggregate and propagate the telemetry state information in the packet-optical network 102). According to the POINT framework 100, telemetry information for a packet-optical traffic flow 105, such as intent or POINT data (e.g., intent and response), in the packet-optical network 102 is gathered in the data plane 140 as part of the information carried in the network 102, as described below. The telemetry plane 160 represents the telemetry information for the packet optical flow 105 being mapped and correlated across network layers, constructs (e.g., secure network communications (SNC), label-switched path (LSP), or virtual local area network (VLAN)) and devices operating at different layers in the networking stack to give the end user (e.g., at the POINT sink) a unified view of the operation of the entire packet-optical network 102.

In accordance with the disclosed POINT framework 100, a POINT source device 110 may initiate a network telemetry data collection for a packet-optical flow 105 along a packet-optical data path from the source device 110 to a sink device 120. Along the packet-optical data path, POINT intermediate devices, such as POGs 114, 116, and optical devices 126, 128, may interpret the intent, collect the desired telemetry data, and encode it back into the packet (flow) 142, which eventually gets forwarded to the sink device 120. For example, as packet (frame) 142 traverses the packet-optical network 102 across devices and layers (e.g., packet layers L2/L3 and optical layers L1/L0), in the data plane 140 intent information is transferred into other layers, translated into device-specific actions, and responses are collected (e.g., added to POINT data in packet 142) for use at the POINT sink device 120. At the sink device 120, the collected telemetry data for the packet-optical flow 105 (collected from POINT source device 110 to POINT sink device 120) is processed as needed by the intended applications. Examples of telemetry data processing may include triggering a report to a management entity (e.g., using mechanisms like OpenConfig) or archiving collected data in a storage device.

Figure 2:
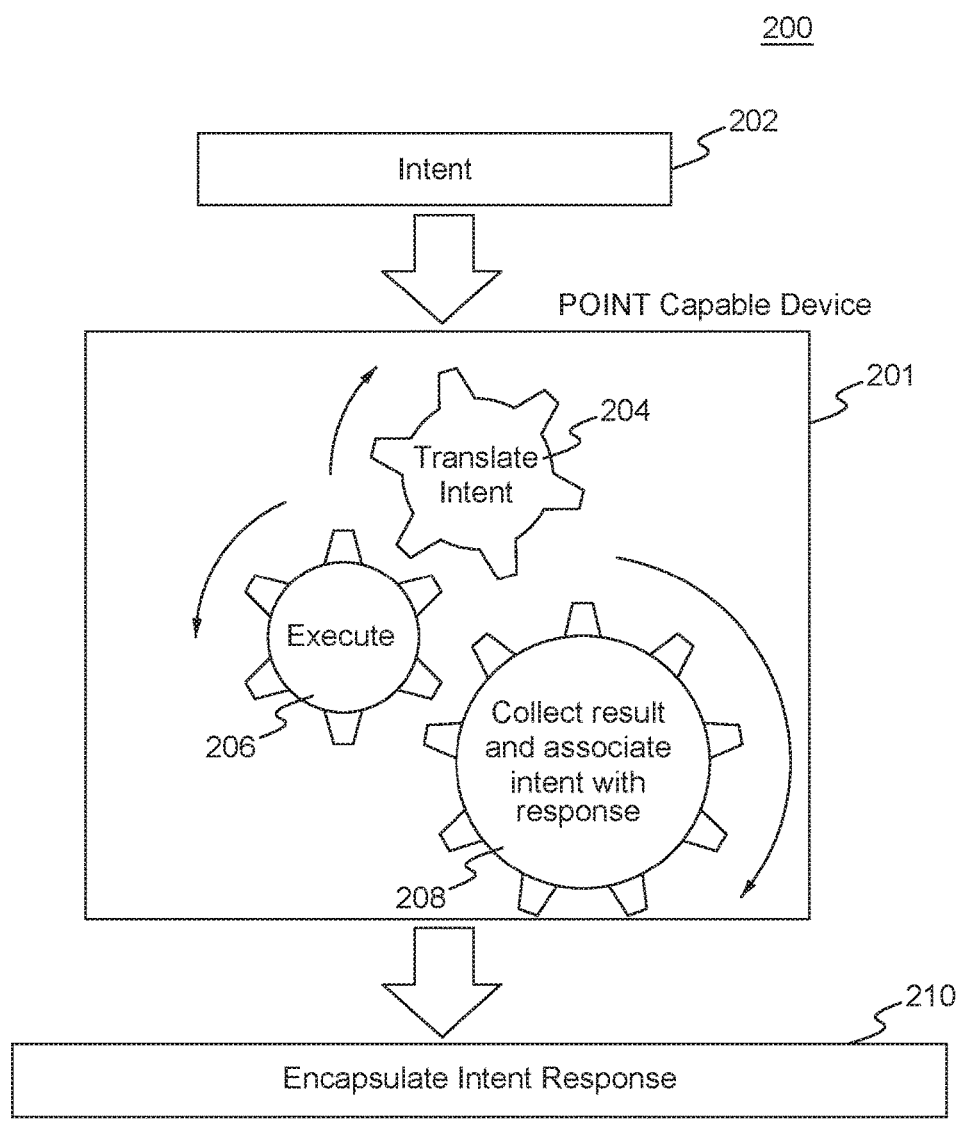
FIG. 2 shows an example intent processing procedure that may be performed by a POINT capable device on received intent data.

FIG. 2 shows an example intent processing procedure 200 that may be performed by a POINT capable device 201 on received intent data 202 (e.g., the intent data 202 may be received in a header of a received packet or frame). As 204, the POINT capable device 201 may translate the intent data 202 into a device-specific action in the data plane. At 206, the POINT capable device 201 may execute the device-specific action based on the received intent 202 (i.e., execute the intent), 204. At 208, the POINT capable device 201 may then collect the result of the device-specific action (i.e., execution of the intent), associate (correlate) the result with the corresponding intent 202, and encode the result (response) as data to be carried downstream along the (e.g., packet-optical) path. At 210, the POINT capable device 201 may encapsulate the intent and response data consistent with the data forwarding mechanisms of the segment of the network. In an example, if received intent data cannot be interpreted by an intermediate device along the path in the network, the intermediate device may act as a bypass for that intent by forwarding but not executing the intent.

POINT intent may be generic and device-independent, in which case POINT devices must translate the intent to a specific action to collect specific telemetry data. While a device can directly act on the intent, it can also translate the intent into existing (i.e., known to the device) operations, administration and management (OAM) actions. For example, POGs may be responsible for interpreting the intent and translating it appropriately to an action known to devices in the optical network. Example translations for optical network devices include initiation and collection of telemetry data like Q-factor, latency, or BER, using native (i.e., layer-specific) mechanisms in the optical devices.

According to the disclosed POINT framework, intent translation across layers may be asynchronous. In an example scenario, the original packet layer intent may be translated into an OTN L1 frame header for execution at optical devices. The translation of the intent may occur at the packet-optical boundary, for example at a POG. While the faster OTN L1 layer has the capability to multiplex many slower client layer packets, the OTN L1 may be able to carry only limited translated intent information in a frame. Moreover, the encoding of the translated intent into the OTN L1 overhead (OH) may not be possible in frames where the L1 OH is being fully utilized for other data. In these cases, the translated intent that cannot be handled at an intermediate device may be queued such that the queued translated intent(s) are pushed to the OTN L1 OH when the previous requests are completed by the network, which may cause the packet intent and translated (e.g., OTN L1) intent to be different. To address this issue, the packet along with its intent may be encoded into the L1 frame to allow the sink device to correctly execute the packet and optical network telemetry data correlation process.

After the intent has been processed and the telemetry data collected at an intermediate device, the intermediate device communicates the response to the downstream POINT devices, including the sink device, by encoding the response as a part of the POINT data and adding it to a frame. For example, a POG at a downstream optical-packet boundary may be responsible for encoding the optical telemetry data gathered in the optical network segment back into an appropriate packet format for the consumption of the sink device.

Depending on the type of telemetry data requested by the intent information, the desired response may or may not be ready for communication to the POINT sink device. It is possible that some network state information, such as average utilization of a circuit or tunnel, may be maintained as a rolling average over time and appended as the POINT response inline (i.e., in the same packet as the corresponding intent information) as the data flows through the intermediate device. Other state information, such as latency or Q-factor, may not be readily available and thus may be inserted later in the data flow (i.e., in a later packet or frame subsequent to the original packet carrying the corresponding intent information). In those cases, the POINT response may be delayed in the sense that the intermediate device may communicate the response later in time than the communication of the corresponding intent through the data path to the sink node.

As the response gets hierarchically passed up into the packet layer (e.g., L2/L3), the response data from the lower layer needs to be correctly associated with intent in the higher layer (e.g., higher order ODU), culminating in the packet layer where it gets associated with the original intent (i.e., the intent inserted by the source and prior to translation). In an example, when a POG processes the intent in a packet, it may translate that intent into a request for a specific data measurement from the optical layer and transfer that optical data measurement value into the packet as a response. This association of optical telemetry data to the appropriate packet flow helps realize the framework's goal of correlating telemetry data between packet and optical layers.

In an example, POINT devices may also deploy filtering mechanisms to filter the network state or measurement data collected before communicating the response. For example, a POINT device could be collecting latencies across many different wavelengths but only communicate latency across a specific wavelength requested in the intent.

Figure 3:
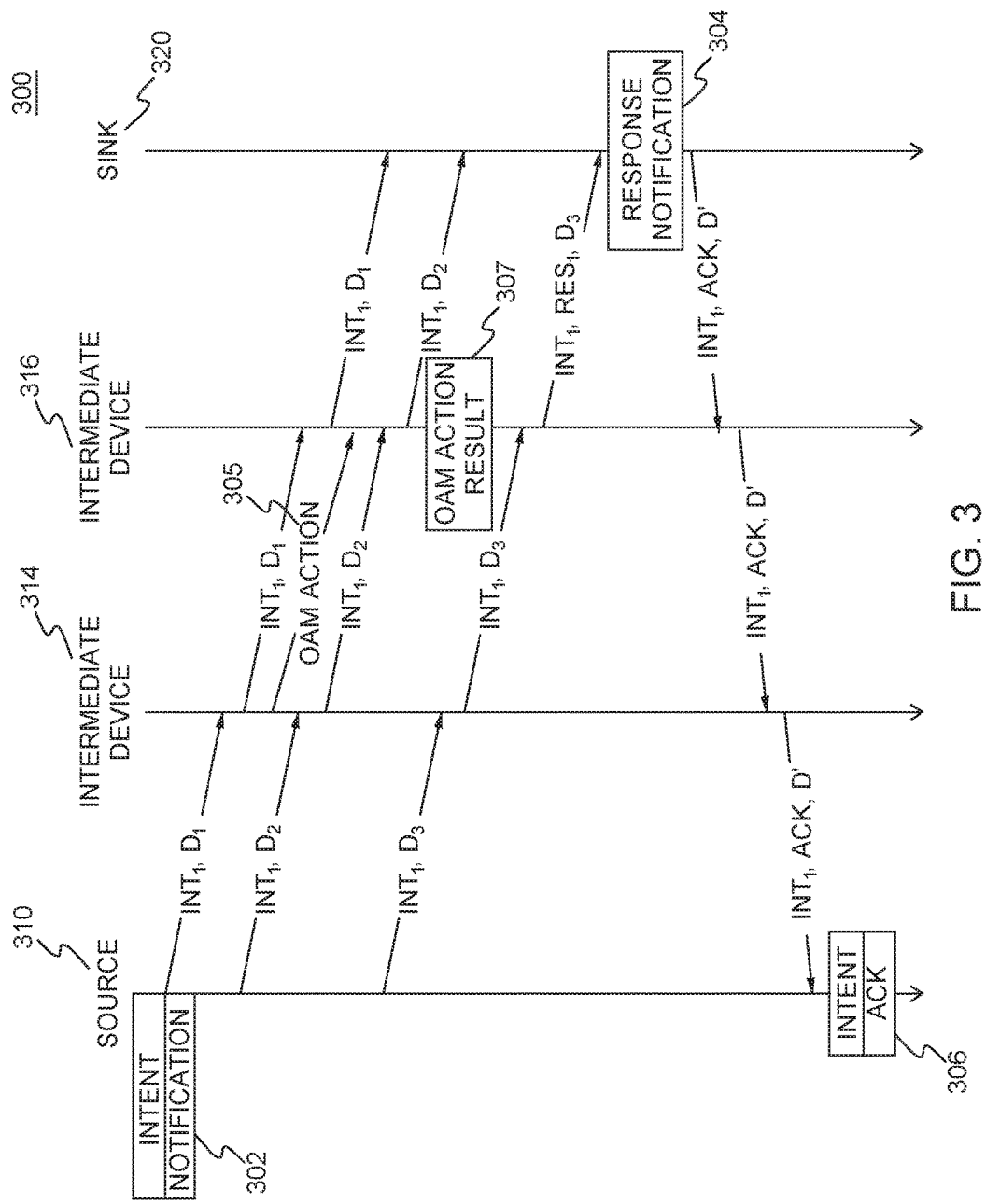
FIG. 3 is a flow diagram of an example flow of intent and response from source device to sink device via intermediate devices.

As an example of disclosed POINT mechanisms, FIG. 3 is a flow diagram of an example flow 300 of intent $INT_1$ and response $RES_1$ from source device 310 to sink device 320. In the example flow 300, the source device 310 and sink device 320 use a request-response mechanism to collect optical telemetry data (D1, D2, D3, and D' are payload data in the packets or frames communicated between devices). For example, the optical telemetry data may be latency measurement data for an optical fiber link between intermediate devices 314 and 316 (although only two intermediate devices are shown, any number of intermediate devices may be in the path of the flow 300).

The source device 310 may send a group-based intent $INT_1$ to collect the latency data. Intermediate device 314 translates the source intent $INT_1$ into an OAM request, then executes the OAM request by performing the appropriate OAM action 305 (e.g., measuring latency measure on the optical fiber link; other examples include measuring latency, BER, Q-factor, power levels, loss of signal and/or other errors) with cooperation from another intermediate device 316, to generate the OAM result 307. In the example flow 300, intermediate device 316 generates response $RES_1$ for the OAM result 307, and the response $RES_1$ gets associated with a subsequent frame that includes intent $INT_1$ and communicated to the sink device 320. Once the response $RES_1$ is received by the sink device 320, the sink device 320 may communicate an ACK as a sink-based intent back to the source device 310 to notify the source device 310 to stop querying for the data for intent $INT_1$. This request-response mechanism serves as an example, such that other means to synchronize information across the source 310 and sink 320 devices may be used.

In addition to interpreting the intent and executing a suitable action, intermediate devices may also be responsible for potentially changing the encapsulation of the intent and response for the consumption of downstream POINT devices. The change of encapsulation may be needed by downstream devices operating at a different networking layer or across different technologies (e.g., virtual extensible local area network (VXLAN) to Internet Protocol (IP)) in order to be able to read the intent to generate a response. For example, a POG may change the encapsulation from packet to optical so that the packet or frame is decodable by optical devices downstream. In another example, an L1 intermediate device may change the encapsulation from L1 to L0 encapsulation or across different technologies.

In an example, POINT intent and response may be communicated through the packet network depending on the exact protocol being deployed in the network. For example, intent and/or response may be communicated over user datagram protocol (UDP) as a payload, or over VXLAN as an option, or over transmission control protocol (TCP) as an option or payload.

In an example for an optical network (that may be part of a packet-optical network), POINT intent and response may be encapsulated as L1 (e.g. ODU) metadata. In the case that ODU is the L1 layer, POINT intermediate devices (e.g., a POG) may process packet intent and transfer the intent to the ODU layer using a set of bytes in the ODU overhead (OH). These ODU OH bytes may remain accessible to all nodes along the end-to-end path of the ODU portion of the network.

Figure 4:
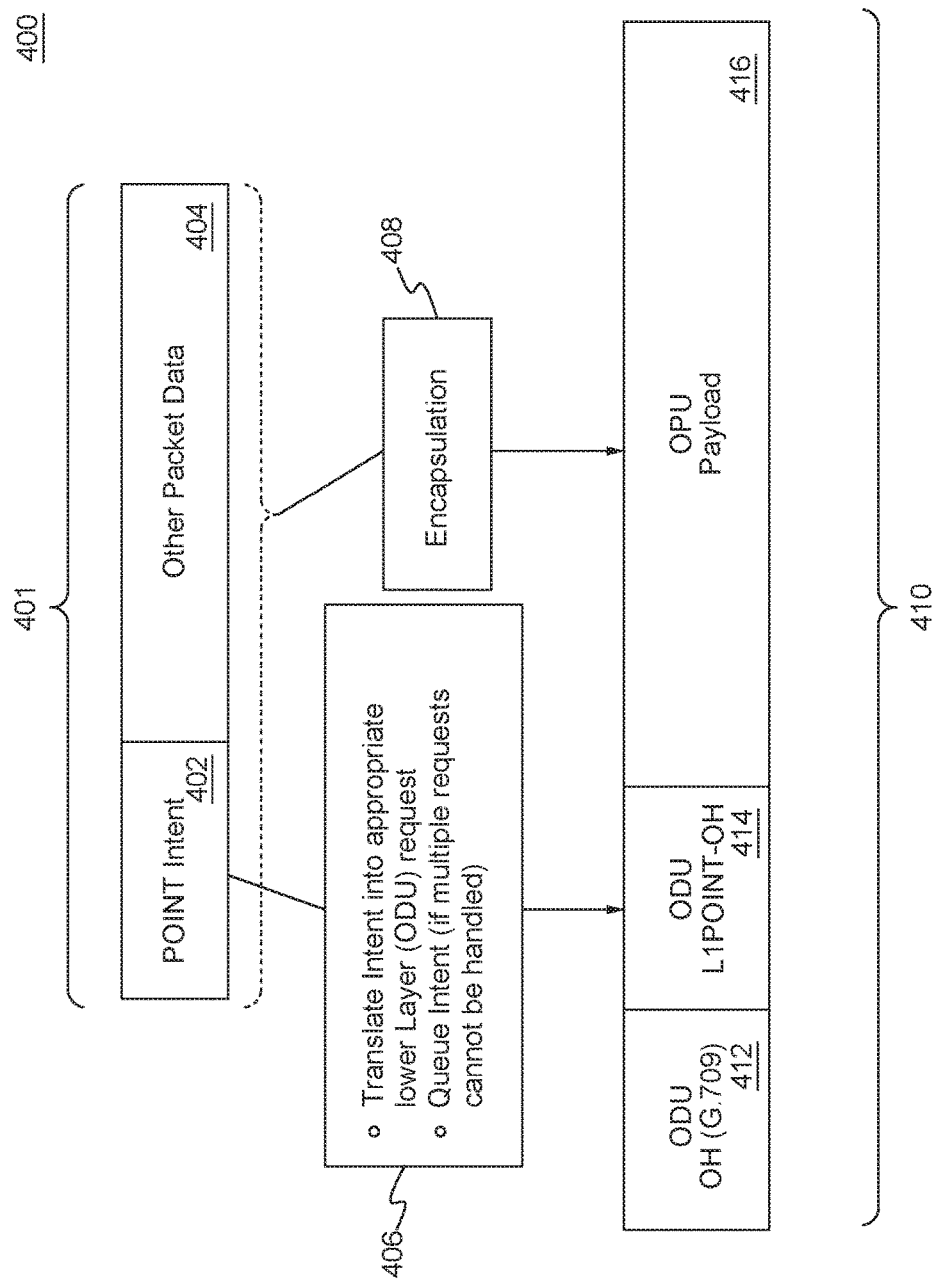
FIG. 4 is a flow diagram of an example intent translation procedure for intent translation from a packet to the optical data unit (ODU) layer.

FIG. 4 is a flow diagram of an example intent translation procedure 400 for intent translation from a packet layer (packet network format) to the L1 ODU layer (optical layer format), that may be performed by a POG at the packet-optical boundary. The packet 401 includes POINT intent information 402 (e.g., in the packet header) and other packet data 404. The point intent information 402 may be translated 406 (and possibly queued) and the packet 401 may be encapsulated 408 into an L1 ODU frame 410. The translated intent, ODU L1POINT-OH 414, may be included in the ODU OH 412 (or anywhere in the L1 ODU frame 410) and the optical payload unit (OPU) payload 416 bits are encapsulated (e.g. using generic framing procedure-framed (GFP-F)) to be placed into the OPU payload 416.

In another example not shown, the payload 416 and/or the intent information 402 may be encapsulated to span multiple ODU frames. The amount of available OH in ODU frames may be small, and in some cases larger messages may need to be transmitted or received in a multi-frame sequence (e.g. the transmission time interval (TTI) message is spread across 64 frames). The length of the multi-frame sequence may be chosen to allow the largest collection of intent, any required parameters, and response to be conveyed in one multi-frame ODU sequence.

Figure 5A:
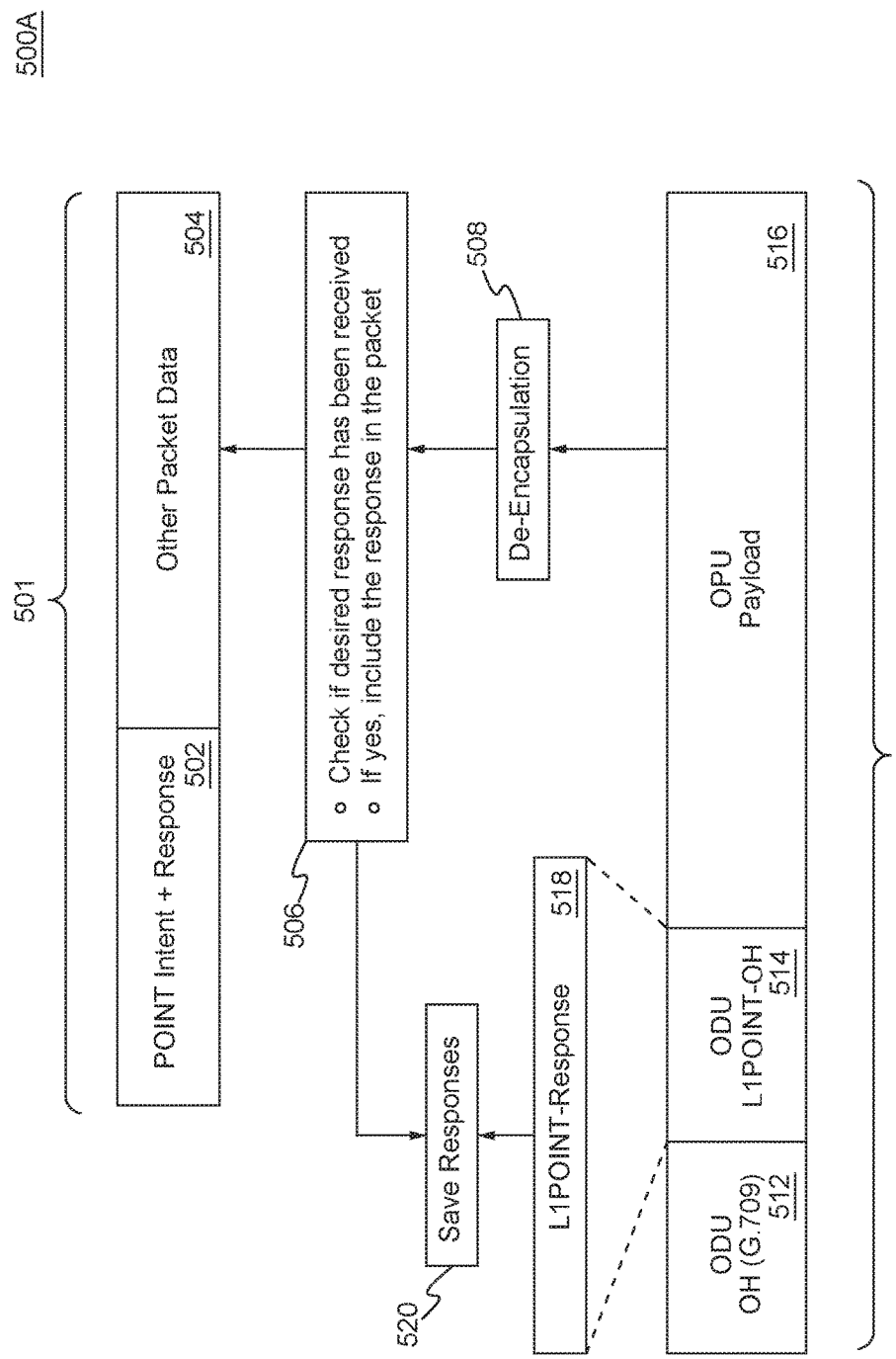
FIGS. 5A and 5B are flow diagrams of example response procedures at the packet and ODU L1 boundary, which may be performed by a packet optical gateway (POG)
Figure 5B:
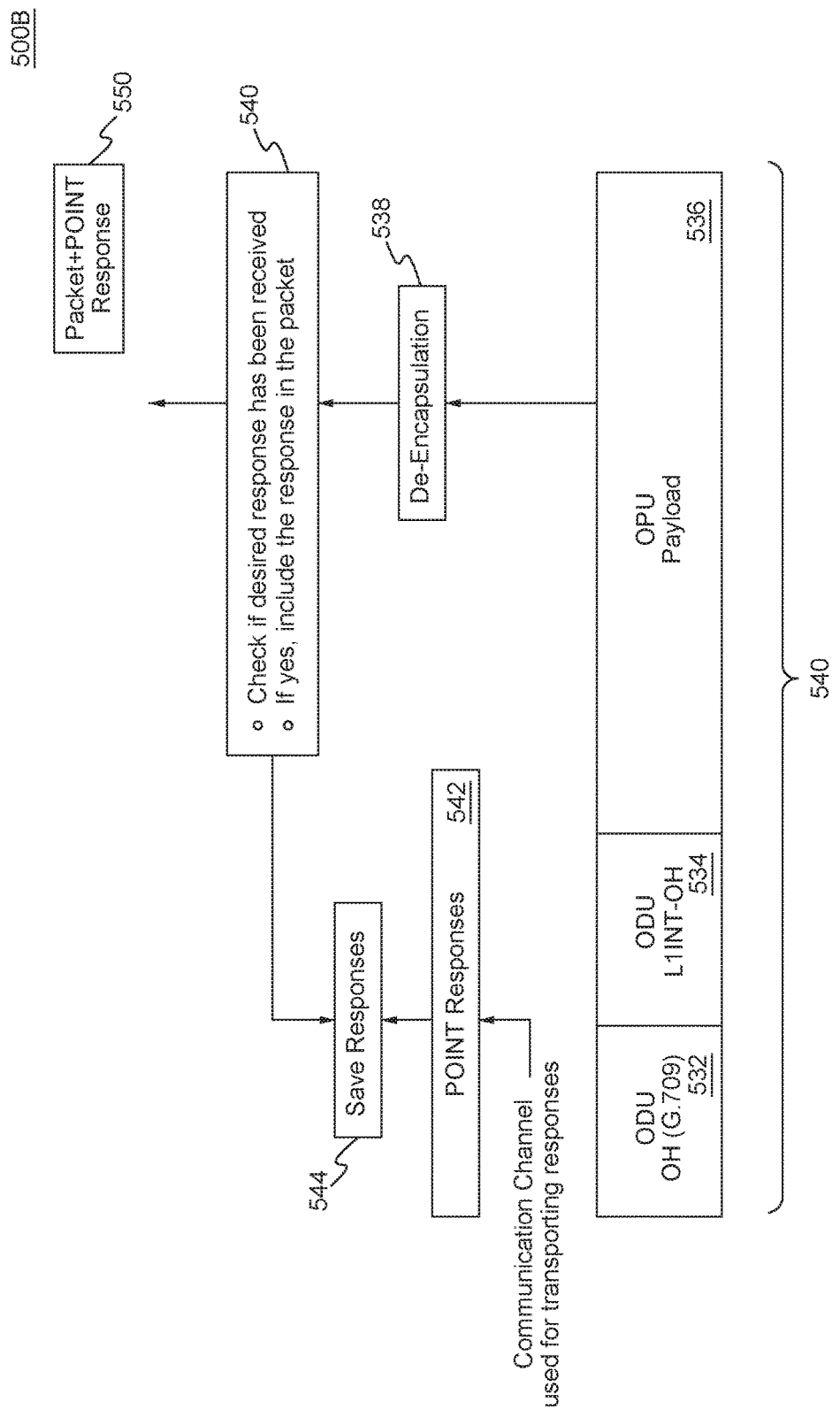

Since the amount of ODU OH usable for intent and responses is limited, the edge devices at layer boundaries (e.g., POG at the packet-optical boundary) may have to carefully select the set of intents that can be concurrently issued and queue the remaining intents until the previous requests have been serviced. FIGS. 5A and 5B are flow diagrams of example response procedures 500A and 500B at the packet and ODU L1 boundary, which may be performed by a POG. FIGS. 5A and 5B show example sequences of operations when transiting from the ODU to the packet domain, which may occur at the ODU termination points, such that the information collected by the L1 network elements may be inserted into the packet stream for consumption by the packet-aware devices.

In FIG. 5A, the OPU payload 516 of the ODU frame 510 may be de-encapsulated 508 to generate the packet payload 504 of packet 501. The L1POINT-response 518 may be extracted from the ODU-L1POINT-OH 514 and saved 520 at the device. At 506, if the desired response has been received (determined by checking saved responses 520), the response may be included as part of the POINT intent and response 502 in the header of the packet 501. The response procedure 500 may be recursively repeated at each client-server boundary, such as ODU1 and ODU4 multiplex/demultiplex points. FIG. 5B shows an example response procedure 500B that may be used for large sized POINT responses 542 that cannot be accommodated in the overhead bytes ODU-OH 532. In this case, the OPU payload 536 of the ODU frame 540 is de-encapsulated 538 to generate a packet payload. The POINT responses 542 are communicated over a separate channel, such as an optical supervisory channel (OSC), and saved 544 at the device. At 540, if the desired response has been received (determined by checking saved responses 544), the response may be included as part of the packet and POINT response 550, for example in the packet header.

Figure 6:
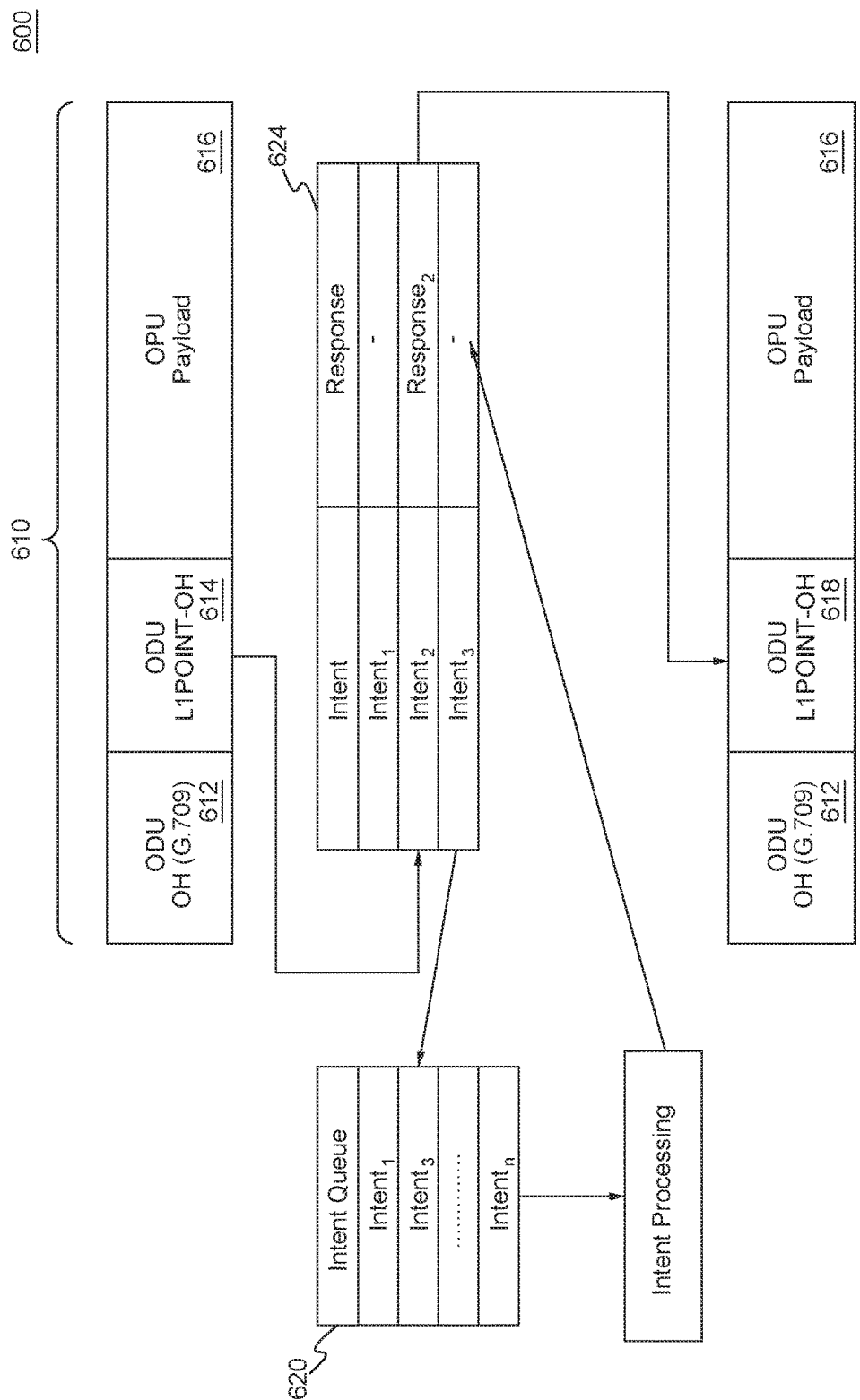
FIG. 6 is a flow diagram of an example response queueing procedure 600 for an ODU frame that may be performed by an intermediate device.

FIG. 6 is a flow diagram of an example response queueing procedure 600 for an L1 ODU frame 610 that may be performed by an intermediate device. The device may read the POINT intent from the ODU frame 610, for example from the ODU-L1POINT-OH 614. The device may check if the response for the intent is ready by looking it up in the associative map or table 624 that keeps a mapping of intent and corresponding response. If the corresponding response is ready, then the response is added to the ODU frame 610, for example into the ODU-L1POINT-OH 614. However, if the response is not ready, the intent may be added to an intent queue 620 for intent translation and processing. Once the corresponding response is determined to be ready (e.g., Response$_2$ for Intent$_2$), then the corresponding intent is removed from the intent queue 620, translated and processed, and inserted in the associative map 624 to be inserted in the ODU frame 610.

As disclosed herein, the POINT framework allows for hierarchical translation of intent along the path from the source to the sink. Intermediate devices at the edges of the hierarchy are responsible for the intent translation and response encapsulation from one layer into another. Intents may be translated into legacy network telemetry actions, such as those specified in OAM standards. POINT can therefore be rolled out in the network incrementally with intermediate devices book-ending a brownfield deployment. The POINT framework can be implemented to be interoperable with INT devices, for example by defining POINT-specific sub-type(s) of INT headers.

POINT can be used to collect targeted telemetry data for performance monitoring or fault localization, and can also enable new use-cases such as traceroute and proof-of-transit for a specific flow or application along a packet-optical path. For example, fault localization to a specific part of the network can be done iteratively in the POINT framework by successively narrowing down the scope of intent querying the fault or performance data from a portion of the network. This may be illustrated in the context of isolating increased latency observed between the source and the sink for a specific flow.

In another example, optical devices can implement traceroute capabilities by building a list of L1 switches encountered along the optical path. In the case of L1 ODU switches, the list of OTN switches may be included and carried as part of the POINT-specific overhead. In the case of L1 and/or L0 switches, the response maybe signaled via an out-of-band channel such as the optical supervisory channel (OSC), and translated back into a POINT response at intermediate devices.

In another example, proof-of-transit, or proof of services offered such as encryption at L1 devices, may be implemented by having the devices participate in a secret sharing scheme, such as Shamir's algorithm, and use their respective shares to update a cumulative value that may be carried as a POINT-specific overhead. The cumulative value may then be validated at the sink (or forwarded to a management station for verification) for the proof of transit or services rendered at specific devices.

Figure 7:
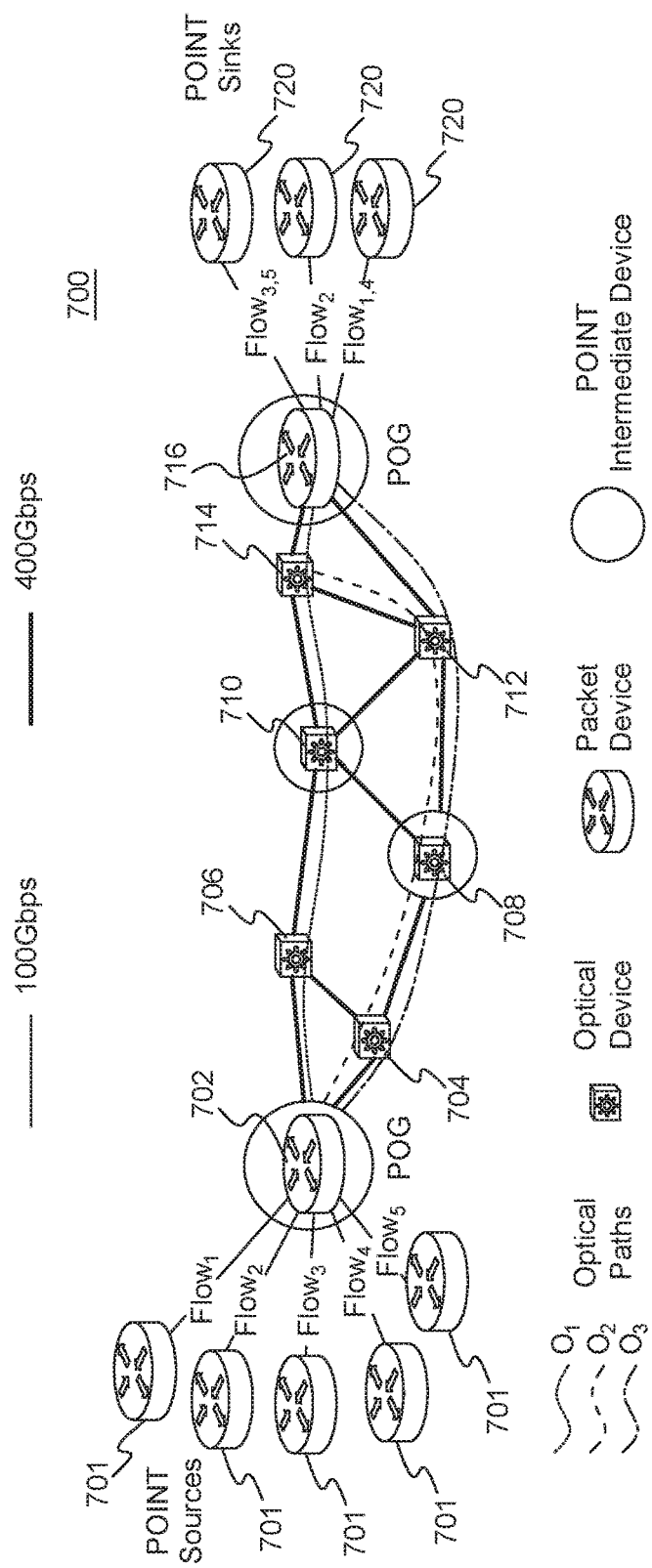
FIG. 7 is a high-level diagram of flows in an example POINT framework implemented in an example packet-optical network.

FIG. 7 is a high-level diagram of example flows over a packet-optical network 700, which use the POINT framework to do real-time load balancing along packet-optical paths. Packet flows $Flow_1, \ldots, Flow_5$ originate at POINT sources 701 and are cross-connected to optical paths $O_1, O_2$ and $O_3$ in the optical segment of the network as follows: $Flow_1$-$O_1$, $Flow_2$, $Flow_3$-$O_2$, and $Flow_4$, $Flow_5$-$O_3$. In this example, the capacity of each of the optical links is 400 Gigabits per second (Gbps) and each packet flow could be as large as 100 Gbps. To get the real-time average link utilization along an optical path $O_1$, $O_2$ and $O_3$, each of the POINT source devices 701 of packet flows $Flow_1, \ldots, Flow_5$ can insert an appropriate intent into the respective flows $Flow_1, \ldots, Flow_5$. As the aggregate bandwidth of flows $Flow_2$-$Flow_5$ nears 400 Gbps, the optical link utilization along each of the optical links POG 702—optical device 704—optical device 708—optical device 112 would get reported to be high, and in response to that, $Flow_4$ can be moved along a different optical path, such as optical path $O_1$, to reduce the load on optical path $O_3$ (and consequently, links POG 702—optical device 704—optical device 708—optical device 712).

The examples of the POINT framework described herein include an intent/response mechanism from POINT source to POINT sink, however, the disclosed intent/response mechanisms may be similarly implemented using any other type of network deployment. In an example, the intent/response information (POINT data) may be passed on via a northbound channel, such as a management plane, where the source and sink devices may not be packet devices. In this case, instead of gathering the intent from a packet and passing on the response via a packet, the POINT intermediate device may get the intent and forward the response via a management plane entity such as a network controller and/or embed POINT data in the L1 frame.

Figure 8:
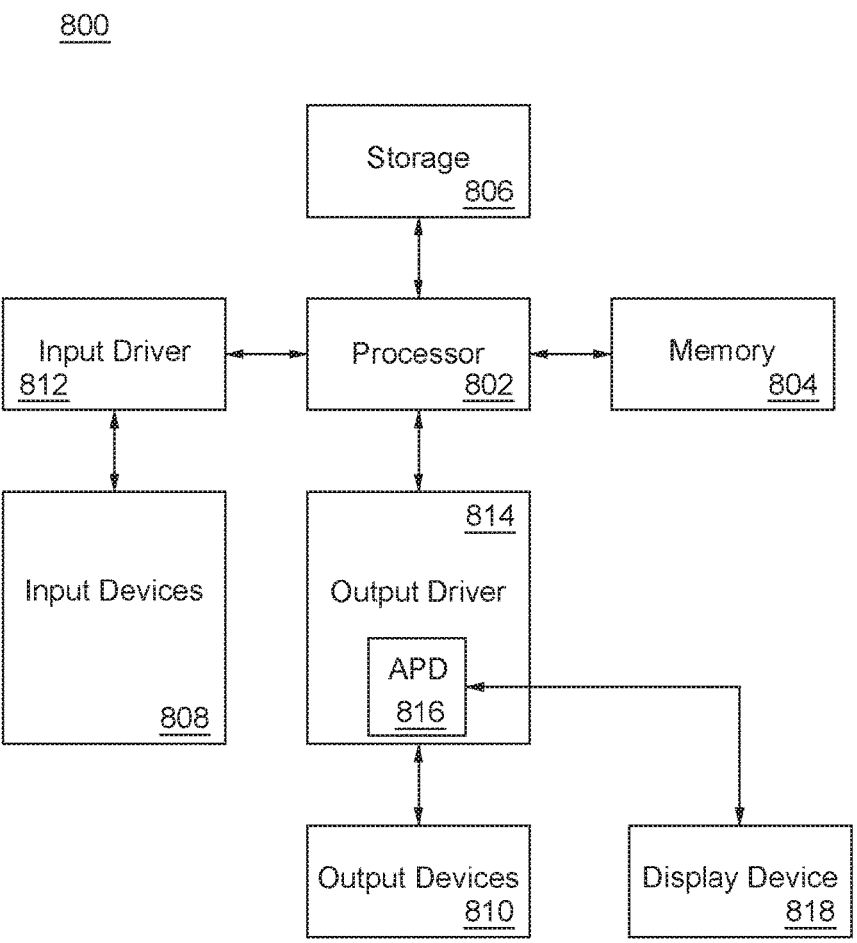
FIG. 8 is a block diagram of a computing system in which one or more disclosed embodiments may be implemented.

In an example, the disclosed POINT framework, and any subset or one or more component(s) thereof, may be implemented using software and/or hardware and may be partially or fully implemented by computing devices, such as the computing device 800 shown in FIG. 8.

FIG. 8 is a block diagram of a computing system 800 in which one or more disclosed embodiments may be implemented. The computing system 800 may include, for example, a computer, a switch, a router, a gaming device, a handheld device, a set-top box, a television, a mobile phone, or a tablet computer. The computing device 800 may include a processor 802, a memory 804, a storage 806, one or more input devices 808, and/or one or more output devices 810. The device 800 may include an input driver 812 and/or an output driver 814. The device 800 may include additional components not shown in FIG. 8.

The processor 802 may include a central processing unit (CPU), a graphics processing unit (GPU), a CPU and GPU located on the same die, or one or more processor cores, wherein each processor core may be a CPU or a GPU. The memory 804 may be located on the same die as the processor 802, or may be located separately from the processor 802. The memory 804 may include a volatile or non-volatile memory, for example, random access memory (RAM), dynamic RAM, or a cache.

The storage 806 may include a fixed or removable storage, for example, a hard disk drive, a solid state drive, an optical disk, or a flash drive. The input devices 808 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 810 may include a display, a speaker, a printer, a haptic feedback device, one or more lights, an antenna, or a network connection (e.g., a wireless local area network card for transmission and/or reception of wireless IEEE 802 signals).

The input driver 812 may communicate with the processor 802 and the input devices 808, and may permit the processor 802 to receive input from the input devices 808. The output driver 814 may communicate with the processor 802 and the output devices 810, and may permit the processor 802 to send output to the output devices 810. The output driver 816 may include an accelerated processing device ("APD") 816 which may be coupled to a display device 818. The APD may be configured to accept compute commands and graphics rendering commands from processor 802, to process those compute and graphics rendering commands, and to provide pixel output to display device 818 for display.

In an example, with reference to FIG. 1, the point source 110, packet devices 112 ad 118, optical devices 122-132, and/or POGs 114, may be implemented, at least in part, with the components of computing device 800 shown in FIG. 8.

It should be understood that many variations are possible based on the disclosure herein. Although features and elements are described above in particular combinations, each feature or element may be used alone without the other features and elements or in various combinations with or without other features and elements.

The methods and elements disclosed herein may be implemented in/as a general purpose computer, a processor, a processing device, or a processor core. Suitable processing devices include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods, flow charts and elements disclosed herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A device configured for packet-optical in-band telemetry in a packet-optical network, the device comprising:
   a processor configured to:
      receive a packet including at least a header and a payload at a packet layer;

read intent information from the header, wherein the intent information indicates a type of telemetry data;

translate the intent information from the packet layer to generate a device-specific action in an optical layer, wherein the device-specific action provides the type of telemetry data;

execute the device-specific action in the optical layer to generate a response corresponding to the intent;

associate the response with the intent; and encode the response in the packet layer for downstream data forwarding.

2. The device of claim 1, wherein the intent information is sink-based intent to communicate packet flow telemetry data from a source device to a sink device.

3. The device of claim 1, wherein the intent information is group-based intent.

4. The device of claim 1 configured as a packet optical gateway (POG).

5. The device of claim 1, wherein the packet layer is packet layer 2/layer 3 (L2/L3).

6. The device of claim 1, wherein the optical layer is optical transport network (OTN) layer 1/layer 0 (L1/L0).

7. The device of claim 1, wherein the processor is further configured to extract the response from an optical data unit (ODU) frame.

8. The device of claim 1, wherein the processor is configured to encode the response for downstream forwarding by inserting the response into the header of the packet with the intent information.

9. The device of claim 1, wherein the processor is further configured to:

add the intent information to an associative mapping table;

match the response to the corresponding intent information using the associative mapping table; and insert the response into a header of a subsequent packet.

10. The device of claim 1, wherein the processor is further configured to encapsulate the packet to be decodable by downstream devices.

11. A method for packet-optical in-band telemetry in a packet-optical network, performed by a device, the method comprising:

receiving a packet including at least a header and a payload at a packet layer;

reading intent information from the header, wherein the intent information indicates a type of telemetry data;

translating the intent information from the packet layer to generate a device-specific action in an optical layer, wherein the device-specific action provides the type of telemetry data;

executing the device-specific action in the optical layer to generate a response corresponding to the intent;

associating the response with the intent; and encoding the response in the packet layer for downstream data forwarding.

12. The method of claim 11, wherein the intent information is sink-based intent to communicate packet flow telemetry data from a source device to a sink device.

13. The method of claim 11, wherein the intent information is group-based intent.

14. The method of claim 11 wherein the device is a packet optical gateway (POG).

15. The method of claim 11, wherein the packet layer is packet layer 2/layer 3 (L2/L3).

16. The method of claim 11, wherein the optical layer is optical transport network (OTN) layer 1/layer 0 (L1/L0).

17. The method of claim 11, further comprising:

extracting the response from an optical data unit (ODU) frame.

18. The method of claim 11, wherein the encoding the response for downstream forwarding includes inserting the response into the header of the packet with the intent information.

19. The method of claim 11, further comprising:

adding the intent information to an associative mapping table;

matching the response to the corresponding intent information using the associative mapping table; and inserting the response into a header of a subsequent packet.

20. The method of claim 11, further comprising:

encapsulating the packet to be decodable by downstream devices.

* * * * *